Dec. 24, 1968   W. W. MOJDEN ET AL   3,417,853
CONVEYOR ASSEMBLY
Filed Dec. 6, 1966   2 Sheets-Sheet 1
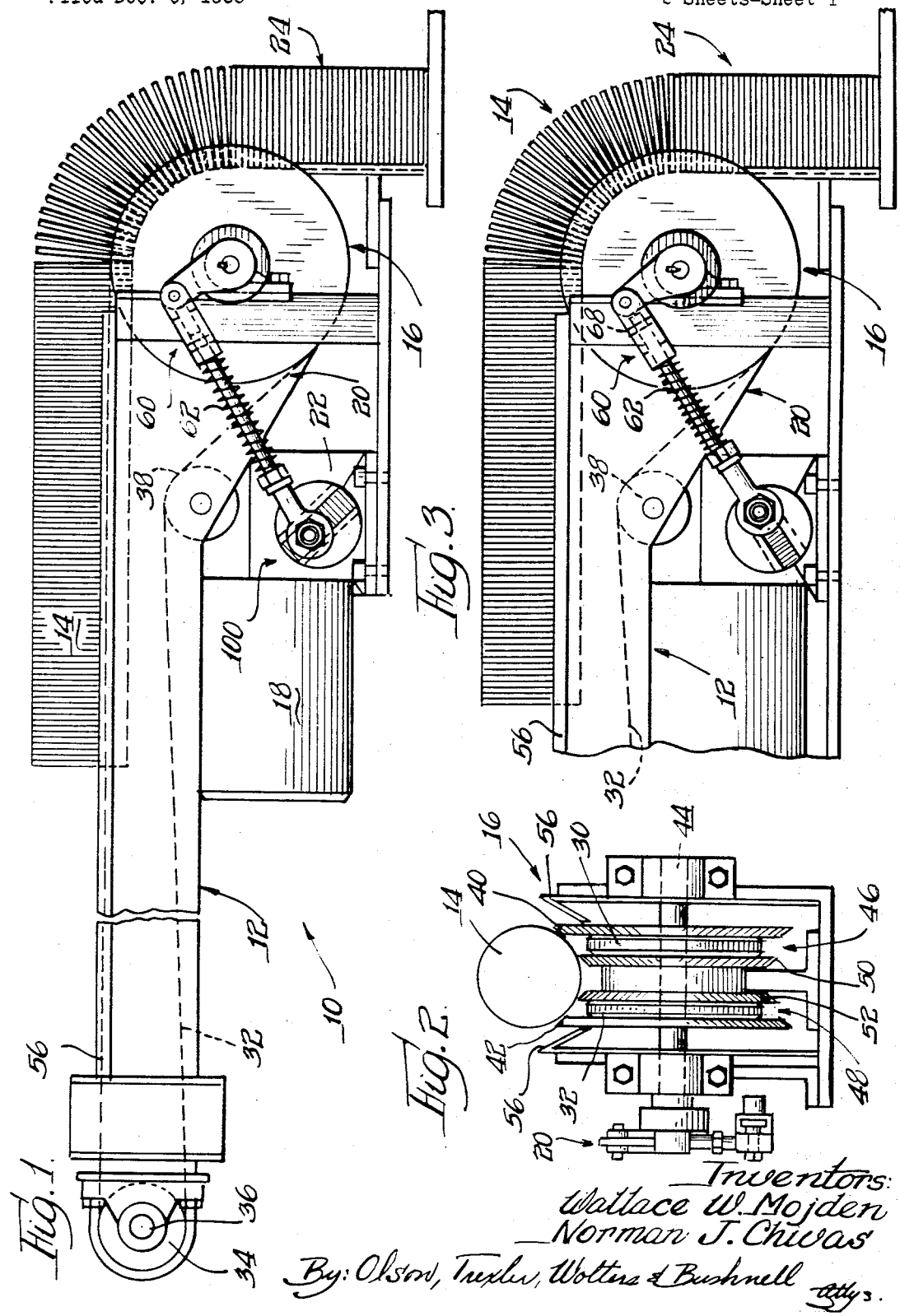
Inventors:
Wallace W. Mojden
Norman J. Chivas
By: Olson, Trexler, Wolters & Bushnell
Attys.

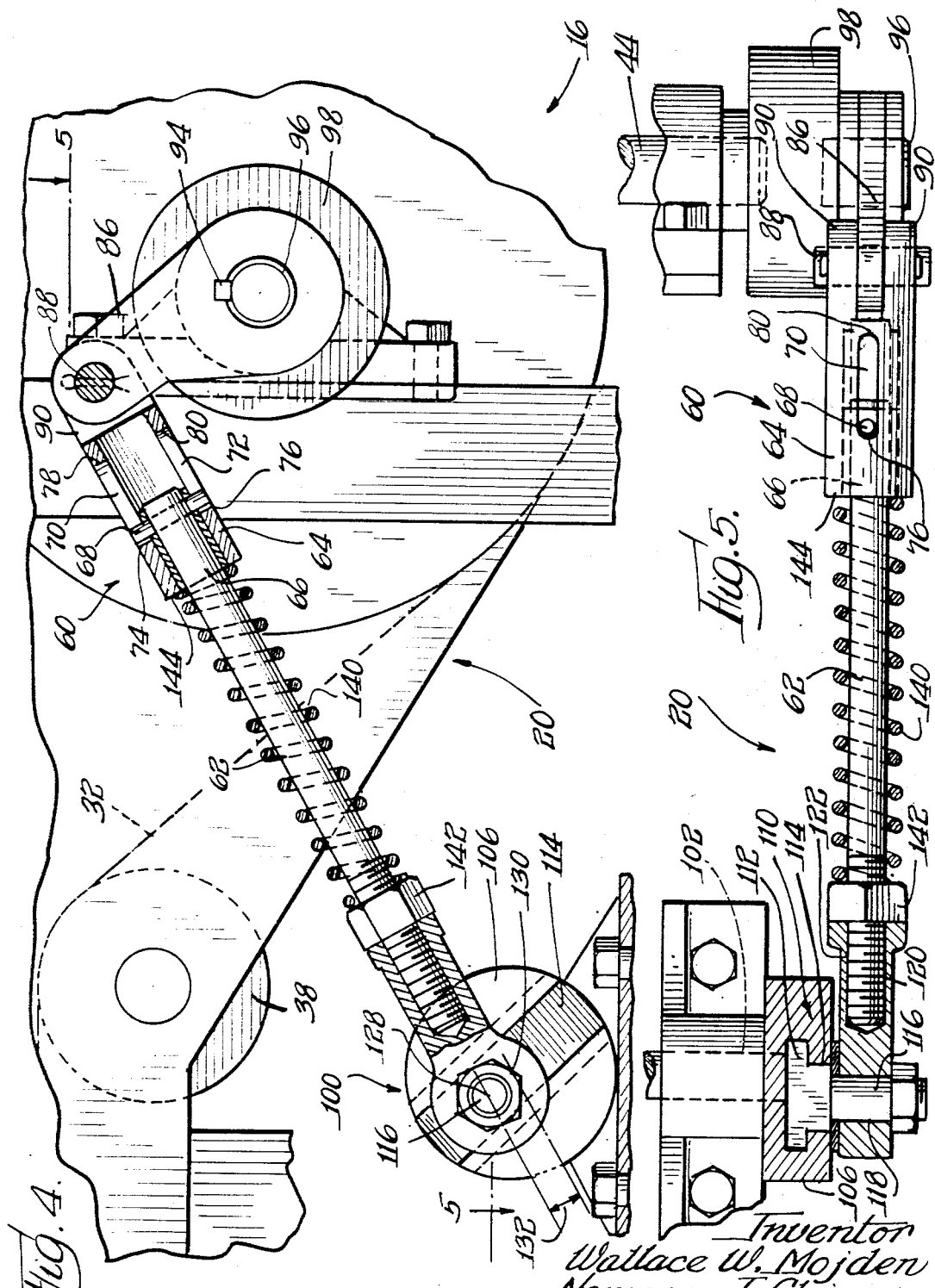

3,417,853
CONVEYOR ASSEMBLY
Wallace W. Mojden, Palos Heights, and Norman J. Chivas, Naperville, Ill., assignors to Fleetwood Systems, Inc., Lyons, Ill., a corporation of Illinois
Filed Dec. 6, 1966, Ser. No. 599,460
9 Claims. (Cl. 198—22)

ABSTRACT OF THE DISCLOSURE

A transfer apparatus for can ends or the like comprising a magnetic roller upon which an endless conveyor is mounted for movement in response to the rotation of the roller. A drive mechanism is provided which includes a motor having a pushrod connected at one end thereto and at the other end is connected to the roller for rotating the latter in a step-like manner. If the quantity of articles being transferred by the conveyor and roller becomes too great at a depositing station at the end thereof, so that the can ends are bunched up along the conveyor and on the roller, a disabling mechanism incorporated in the drive apparatus causes the force normally transmitted by the pushrod from the motor to the roller, to be discontinued until the quantity of articles is reduced.

---

This invention relates generally to a conveyor mechanism, and more particularly to apparatus for handling and conveying metal discs or can ends.

Can ends have previously been conveyed to can seamers or closing machines by using a gravity type conveyor trough with a vibrator and a magnetic roller or wheel. The can ends are fed to the magnetic roller or wheel by the gravity type conveyor with planar surfaces of the can ends in substantially vertical juxtaposition. The magnetic roller or wheel changes the orientation of the can ends to supply the can seamer machine with can ends having their planar surfaces in substantially horizontal juxtaposition. This reorientation of the can ends is necessitated by the construction of conventional can seamer machines to receive can ends with their planar surfaces in a substantially horizontal position.

These prior art conveying mechanisms have proven to be generally satisfactory in service. However, difficulty has been experienced in loading the gravity type conveyor trough which is generally used. In order to have the requisite downward slope of the trough toward the magnetic roller, it is necessary to raise the outer end of the relatively long trough a considerable distance above the floor. When this is done, the outer end of the trough projects so high in the air that it is difficult to load with can ends.

To overcome this problem of loading gravity type feeding troughs, attempts have been made to utilize conventional belt conveyors to feed can ends to the magnetic roll or wheel. However, the rate of feed of the belt conveyors does not usually coincide exactly with the rate of feed of the can seamer machine which was being supplied with can ends. This variation of the feed rate of the conveyor relative to the feed rate of a can seamer machine results in either an under supply or an over supply of can ends at the can seamer machine. An under supply of can ends results in the seamer machine having more can bodies for can ends than can ends for application to the can bodies. If an over supply of can ends is provided at the can seamer machine, the seamer machine will often be damaged by the resulting overflow of can ends.

Therefore, it is an object of this invention to provide a belt conveyor means for supplying can ends to a can seamer machine with the rate of feed of the belt conveyor means coinciding with the feed rate of the can seamer machine.

Another object of this invention is to provide a means for automatically disabling a belt conveyor means when an over supply of the objects being conveyed is present at the machine to which the objects are being fed.

Another object of this invention is to provide a belt conveyor means for feeding can ends to a can seamer machine, the belt conveyor means being equipped with an automatic disabling means to stop the feeding of can ends to the can seamer machine when the supply of can ends at the can seamer machine exceeds a predetermined quantity.

These and other objects and features of the invention will be more apparent upon a reading of the following detailed description taken in connection with the accompanying drawings wherein:

FIG. 1 is an elevational side view of a conveyor assembly, which forms a preferred embodiment of the invention, for feeding can ends or other planar articles to a receiving station of a can seamer machine;

FIG. 2 is an elevational end view of a magnetic wheel or roll which is utilized with the conveyor assembly of FIG. 1;

FIG. 3 is a partial elevational side view of the conveyor assembly of FIG. 1 illustrating the operation of an overload disabling assembly for stopping movement of the conveyor when the supply of can ends at a can end receiving station of a seamer machine exceeds a predetermined quantity;

FIG. 4 is an enlarged fragmentary sectional view illustrating a drive and disabling assembly utilized with the conveyor assembly of FIG. 1; and FIG. 5 is an enlarged plan view, taken along the line 5—5 of FIG. 4, further illustrating the construction of the drive and disabling assembly for the conveyor assembly of FIG. 1.

Referring now to the drawings in greater detail, a can handling conveyor assembly 10 forming a preferred embodiment of the invention is illustrated in FIG. 1. The conveyor assembly 10 includes a generally horizontally extending belt conveyor 12 for feeding can ends 14 or other substantially planar metallic articles to a magnetic roller or wheel 16. The conveyor 12 and magnetic roller or wheel 16 are powered by an electric motor or other source of power 18. Power is transmitted from the motor 18 to a drive assembly 20 for both the conveyor 12 and magnetic roller 16 by a transmission assembly 22. The drive assembly 20 rotates the magnetic wheel or roller 16 to move the can ends from a substantially upright position on the conveyor 12 to a substantially horizontal position at an article receiving or operating station 24 of a conventional can seamer or closure machine. The can seamer or closure machine applies the can ends 14 to bodies of cans in a known manner.

Referring now to FIG. 1, taken in conjunction with FIG. 2, the conveyor 12 includes a pair of substantially parallel spaced apart belts 30 and 32 which extend lengthwise from an idler pulley 34 (FIG. 1) which is journaled for rotation about a shaft 36 at an outer end of the conveyor 12. The belts 30 and 32 extend around the magnetic roller 16 so that can ends are carried by the belts 30 and 32 into engagement with the roller 16. A tensioning pulley 38 is provided to maintain the belts taut and in secure engagement with the pulley 34 and roller 16. The magnetic roller 16 is rotated in a clockwise direction by the drive assembly 20 to move both the roller 16 and the belts 30 and 32. The movement of the belts 30 and 32 carries the can ends 14 forwardly into engagement with a pair of spaced apart radially outwardly extending flanges or discs 40 and 42 (FIG. 2) which are mounted on a central axis 44 of the magnetic roller 16.

Referring now to FIG. 2, the belts 30 and 32 are positioned in engagement with a pair of guide grooves or pulleys 46 and 48 which are positioned between the two discs 40 and 42. The pulleys 46 and 48 are formed by the outwardly projecting discs 40 and 42 and a pair of axially inwardly spaced flanges 50 and 52 which engage opposite sides of the belts 30 and 32 from the discs 40 and 42. Thus, the can ends 14 are carried by the conveyor 12 on a pair of spaced apart substantially parallel extending belts 30 and 32, which engage the lower edge of the substantially planar can ends, to conduct the can ends into engagement with a pair of outwardly extending discs 40 and 42 on the magnetic roller 16. The can ends 14 are retained in an upright relationship on the belts 30 and 32 by inwardly sloping opposite side sections 56 of the conveyor 12.

As previously explained, the magnetic roller 16 includes a pair of radially outwardly extending discs 40 and 42 which form the outer edges of a pair of grooves 46 and 48 in which the belts 30 and 32 are positioned. The magnetic roller 16 is constructed in a manner somewhat similar to that set forth in patent application Ser. No. 501,927, filed by Mojden and Chivas, on Oct. 22, 1965. Since the structure of an exemplary magnetic roller is set forth in considerable detail in the aforementioned application, it is not believed to be necessary to set forth the details of the structure of the magnetic roller 16 at this time. However, it should be noted that a pair of magnets are positioned in abutting relationship with the radially outwardly extending flanges 40 and 42. These magnets are located axially inwardly of the outwardly extending discs or flanges 40 and 42, and radially inwardly of the belts 30 and 32. These magnets magnetize both the radially outwardly extending discs or flanges 40 and 42 and the flanges 50 and 52 which form the axially inner sides of the pulleys or grooves 46 and 48 for holding the belts 30 and 32 in position on the magnetic roller 16. As is explained in the aforementioned application filed on Oct. 22, 1965 by Mojden and Chivas, the magnetic discs 40 and 42 are of a first common magnetic polarity, and the flanges 50 and 52 are of a second opposite magnetic polarity so that a magnetic field extends from the flanges 50 and 52 through the can ends 14 to the discs 40 and 42. Since the magnetic roller 16 is rotated in a clockwise direction (as seen in FIG. 1) by the drive assembly 20, the belts 30 and 32 are moved forwardly from the idler pulley 34 (see FIG. 1) toward the magnetic roller 16 to carry the can ends forwardly into the magnetic field extending from the flanges 50 and 52 to the discs 40 and 42. The clockwise rotation of the magnetic roller 16 places the can ends 14 in a substantially horizontal orientation at the can end receiving station 24 of a can seaming machine.

As the can ends are fed to the receiving station 24 of the can seaming machine, the can ends tend to accumulate at the can end receiving station 24 if they are not used by the can seaming machine for application to the bodies of cans. As the accumulation of can ends at the receiving station grows, the can ends 14 back up onto the magnetic roller 16 and conveyor 12 as shown in FIG. 3. The backed up can ends 14 are positioned in close juxtaposition on the roller 16 and the conveyor 12. The closely packed can ends frictionally engage the surface of the magnetic roller 16 and oppose the clockwise rotation of the magnetic roller by the drive assembly 20. The clockwise rotation of the magnetic roller 16 is also opposed by the weight of the can ends on the roller. This combination of frictional and weight loading of the magnetic roller 16 applies an overload force to the drive assembly 20 to operate a conveyor overload disabling assembly 60 which forms an integral part of the drive assembly 20. When the conveyor overload disabling assembly 60 is operated, the magnetic roller 16 remains substantially stationary relative to the can end receiving station 24. Thus, when the conveyor overload disabling assembly 60 is operated, can ends are no longer fed to the now over supplied can end receiving station 24.

The structure of the drive assembly 20, including the conveyor overload disabling assembly 60 is illustrated in greater detail in FIGS. 4 and 5. The drive assembly 20 includes a push rod 62 which is positioned in sliding engagement with the conveyor overload disabling assembly 60. The conveyor overload disabling assembly 60 includes a housing or sleeve 64 which surrounds an end portion 66 of the rod 62. A pin or key 68 extends through the end portion 66 of the rod 62 into a pair of axially aligned, substantially parallel, slots 70 and 72 which are formed on opposite sides of the housing 64. The rod 62 and housing 64 are positioned in a coaxial telescopic relationship to enable the rod 62 to slide telescopically inwardly relative to the housing 64 to move the pin 68 from a first position abutting an axially outer edge surface 74 of the slot 70 and an axially outer edge surface 76 of the slot 72, to a second position abutting an axially inner edge surface 78 of the slot 70 and an axially inner edge surface 80 of the slot 72. The rod 62 is moved telescopically inwardly relative to the housing 64 when the magnetic wheel 16 and conveyor 12 are overloaded with can ends, due to an over-supply of can ends at the can end receiving station 24, as illustrated in FIG. 3. As will be explained in greater detail subsequently, when the rod 62 is moved telescopically inwardly relative to the housing 64, the drive assembly 20 is effectively disabled from rotating the magnetic roller 16 relative to the can end receiving station 24.

The housing 64 is connected to a drive arm or crank 86 by a pin 88 which extends between a pair of spaced apart connector ears 90 formed in the axially inner end of the housing 64. The crank arm 86 is in turn connected by a key 94 (see FIG. 4) to a clutch shaft 96. The clutch shaft 96 extends into an overrunning clutch or ratchet drive mechanism 98 which is of known construction and transmits a unidirectional drive to the mounting shaft 44 (see FIG. 5) of the magnetic roller 16. The clutch 98 enables the magnetic roller 16 to be driven in only the clockwise direction, as viewed in FIGS. 1 and 3. The clockwise rotation of the magnetic roller 16 results from a reciprocating movement of the push rod 62 and conveyor overload disabling assembly 60. This reciprocating movement of the push rod 62 and conveyor overload disabling assembly 60 oscillates the crank arm 86 back and forth, in first a clockwise and then a counterclockwise direction. When the crank arm 86 is oscillated in a clockwise direction, the magnetic roller 16 is also moved in a clockwise direction. When the crank arm 86 moves counterclockwise, the motion of the crank arm is not transmitted by the overrunning clutch or ratchet drive 98 to the shaft 44 of the magnetic roller 16. Therefore, when the crank arm 86 is moved in a counterclockwise direction, the magnetic roller 16 remains substantially stationary relative to the can end receiving station 24.

The push rod 62 is reciprocated by means of a connector assembly 100 which is connected to the gear transfer mechanism 22 by a central shaft 102 (see FIG. 5). The central shaft 102 is rotated in a clockwise direction by the gear transfer mechanism 22. The rotations of the shaft 102 are transferred to a drive or stroke plate 106 which is mounted with a central axis coaxial with the central axis of the shaft 102. Thus, the drive or stroke plate 106 and the shaft 102 rotate about the same axis of rotation. The push rod 62 is connected to the drive plate 106 by a key and slot assembly 110 which is best seen in FIG. 5. The key and slot assembly 110 includes a generally T shaped key 112 which is positioned in sliding engagement with a generally T-shaped slot 114 formed in the drive plate 106. A connector shaft 116 extends from the key 112 into an aperture 118 formed in a connector member 120 to which the push rod 62 is attached by threaded engagement with a suitably formed socket 122 in the connector member 120.

The distance through which the push rod 62 is reciprocated by the connector assembly 100 can be varied by moving the center (indicated at 128 in FIG. 4) of the connector shaft 116 relative to the center of rotation (indicated at 130 in FIG. 4) of the drive plate 106 and drive shaft 102. The distance by which the center 128 of the connector shaft 116 and the center of rotation 130 of the drive plate 106 are offset is called the stroke arm 132 for the connector assembly 100. The stroke arm 132 is adjusted by moving the key 112 in the slot 114 of the drive plate 106. As the key is moved radially outwardly from the center of rotation 130 of the drive plate 106, the stroke arm 132 and the distance through which the push rod 62 is reciprocated by rotation of the drive plate 106 is increased. By increasing the stroke arm and the distance through which the push rod 62 is reciprocated, the distance through which the magnetic roller 16 is rotated by each clockwise oscillation of the crank arm 86 is increased. By increasing the distance through which the magnetic roller 16 is rotated by each clockwise oscillation of the crank arm 86, the feed rate of can ends 14 by the magnetic roller 16 to the can end receiving station 24 is also increased. Conversely, when the stroke arm 132 is decreased by moving the center 128 of the shaft 116 toward the center of rotation 130, the rate of feed of can ends 14 to the can end receiving station 24 is decreased, since the arcuate distance through which the magnetic roller 16 is moved by each clockwise oscillation of the crank arm 86 is decreased. Thus, by adjusting the relative position of the center 128 of the shaft 116 and the center of rotation 130, the feed rate of the conveyor assembly 10 can be adjusted to exactly match the feed rate of a can seaming machine.

During the normal operation of the drive assembly 20, the pin 68 of the conveyor overload disabling assembly 60 is retained in abutting engagement with the end surfaces 74 and 76 of the slot 70 and 72 in the housing 64 by a spring 140 which is mounted in a coaxial relationship with the shaft 62. One end of the spring 140 engages an adjusting nut 142 which is threaded onto the push rod 62. An opposite end of the spring 140 engages an outer end surface 144 of the housing 64. The spring presses the housing 64 axially outwardly relative to the push rod 62 to urge the pin 68 firmly against the surfaces 74 and 76 of the slot 70 and 72. It will be apparent that, by threading the adjusting nut 142 toward the conveyor overload disabling assembly 60, the spring force pressing the pin 68 against the outer edges 74 and 76 of the slots 70 and 72 can be varied.

When the supply of can ends at the can end receiving station 24 exceeds a predetermined quantity, the magnetic roller 16 and conveyor 12 are overloaded by can ends as shown in FIG. 3. The overloading of the magnetic roller 16 and conveyor 12 results in relatively large weight and frictional overload forces being exerted on the magnetic roller 16. These overload forces oppose the clockwise movement of the magnetic roller 16 and tend to hold the magnetic roller 16 in a stationary position relative to the can end receiving station 24. When the overload forces exceed the force exerted by the spring 140 in pressing the pin 68 against the end surfaces 74 and 76 of the slots 70 and 72, the end portion 66 of the push rod 62 is moved telescopically inwardly relative to the housing 64 and the pin 68 is moved toward the inner end surfaces 78 and 80 of the slots 70 and 72. This telescopic movement of the push rod 62 inwardly relative to the housing 64 results in a disabling of the drive assembly 20, since the reciprocating motion of the push rod is not transferred by the housing 64 to the crank arm 86 to drive the magnetic roller 16 and conveyor 12.

The drive assembly 20 is disabled when the overload forces on the magnetic roller 16 and conveyor 12 exceed the spring force which urges the pin 68 into engagement with the outer end of the slots 70 and 72. When the overload forces exceed the resilient force exerted by the spring 140, the shaft 62 is reciprocated relative to the housing 64 and the rotation of the magnetic roller 16 is halted and the feeding of can ends 14 to the can end receiving station 24 is also halted. By moving the adjusting nut 142 relative to the housing 64, the resilient force exerted by the spring 140 retaining the pin 68 against the outer surfaces 74 and 76 of the slots 70 and 72 can be varied to vary the overload force required to disable the drive assembly 20. By varying the overload force required to disable the drive assembly 20, the quantity of can ends which must be accumulated at the can end receiving station 24 before the drive assembly is disabled can also be varied.

The operation of the conveyor assembly 10 will be largely apparent from the foregoing description. However, for purposes of affording a more complete understanding of the invention, it is advantageous now to provide a functional description of the mode in which the component parts cooperate. The conveyor assembly 10 includes a belt conveyor 12 and a magnetic roller 16. The magnetic roller 16 will be rotated by the drive assembly 20 to move a pair of spaced apart, substantially parallel, belts 30 and 32 to transport can ends toward the magnetic roller 16. As the can ends are transported toward the magnetic roller 16, the can end receiving station 24 will be fed with can ends by the magnetic roller 16. When a predetermined quantity of can ends has been accumulated at the can end receiving station 24, an overload force will be applied to the magnetic roller 16 to disable the drive assembly 20.

The disabling of the drive assembly 20 will occur when the overload force exerted by the can ends on the magnetic roller 16 exceeds the resilient force exerted by the spring 140 in pressing the housing 64 outwardly relative to the push rod 62. When the drive assembly 20 is disabled by a relatively large overload force, the push rod 62 will continue to reciprocate under the action of the connector assembly 100. However, the reciprocation of the push rod 62 will not rotate the magnetic roller 16, since the push rod will merely reciprocate back and forth relative to the housing 64 without moving the crank arm 86.

The feed rate of the conveyor assembly 10 can be adjusted by varying the stroke arm 132 of the connector assembly 100. When the stroke arm 132 has been increased, the feed rate of the conveyor assembly 10 will be increased to supply can ends at a greater rate to the can end receiving station 24. Similarly, when the stroke arm 132 is decreased, the rate of can end supply to the can end receiving station 24 will be decreased.

It is contemplated that the conveyor assembly 10 will find many other uses for transporting metallic elements other than can ends. It is also contemplated that specific aspects of the drive structure for the conveyor assembly will be changed to suit the particular use to which the conveyor assembly is put. Thus, other known connector assemblies could be substituted for the connector assembly 100. It will also be apparent that the position of the spring 140 relative to the push rod 62 can be changed. Since the push rod is confined between the housing 64 and connector assembly 100, it is also apparent that the pin 68 can be eliminated, while the push rod 62 is retained in sliding engagement with the housing 64. Therefore, while a particular embodiment of the invention has been shown, it should be understood that the invention is not limited thereto, since many modifications may be made; and it is contemplated to cover by the appended claims any such modifications as fall within the true spirit and scope of the invention.

What is claimed is:

1. A transfer apparatus for supplying objects to an operating station of a machine comprising: conveyor means for conveying the objects to the operating station of the machine, said conveyor means including a magnetic roller and a member mounted on said roller for movement thereby along the path of travel in response to the rotation of said roller; and drive means connected to said magnetic roller for moving said member, said drive means including overload disabling means for automatically disabling said drive means when the supply of the conveyed objects at the operating station exceeds a predetermined quantity, said drive means further including a pushrod for transmitting a driving force from a source of power to said magnetic roller, said pushrod being movable relative to said disabling means from a first force-transmitting position to a second disabled position, said pushrod being ineffective in said second position to transmit the driving force from said source of power to said magnetic roller.

2. An apparatus as set forth in claim 1 further including spring means for urging said push rod from said second position to said first position.

3. A transfer apparatus for supplying objects to an operating station of a machine comprising: conveyor means for conveying the objects to the operating station of the machine, said conveyor means including a magnetic roller and a member mounted on said roller for movement thereby along a path of travel in response to the rotation of the latter; disabling means; and drive means connected to said magnetic roller for driving said movable member, said drive means includes a reciprocating pushrod mounted in sliding engagement with said disabling means for transmitting a driving force from a source of power to said magnetic roller, said disabling means including resilient spring means connected to said pushrod for exerting a force on said pushrod to urge said pushrod and disabling means into a first relationship wherein a driving force is transmitted from said source of power to said roller, said magnetic roller exerting an overload force on said disabling means when the supply of conveyed objects at the operating station exceeds a predetermined quantity, said overload force being sufficient to overcome the force exerted by said resilient spring means and to move said pushrod and disabling means into a second relationship wherein said pushrod is disabled from transmitting a driving force from the source of power to said magnetic roller.

4. A transfer apparatus as set forth in claim 3 wherein: said drive means includes adjusting means for varying the extent of reciprocating movement of said push rod relative to the conveyor means when said push rod is in the first relationship with said disabling means.

5. A transfer apparatus as set forth in claim 3 wherein: said resilient spring means includes a spring member mounted in a coaxial relationship with both said push rod and said disabling means for urging said push rod axially outwardly relative to said disabling means.

6. A transfer apparatus as set forth in claim 3 further including: adjusting means positioned in engagement with said push rod and said resilient spring means for selectively altering the force exerted on the push rod by said resilient spring means.

7. An article handling assembly comprising: a conveyor means for transporting articles with substantially planar surfaces of the articles being positioned in a generally upright juxtaposed relationship; magnetic roller means mounted adjacent to an end of said conveyor means for positioning the articles with their substantially planar surfaces in a generally horizontal relationship at an article-receiving station; and drive means connected to said magnetic roller means for driving said conveyor means and said magnetic roller means to transport the articles from said conveyor means to said article-receiving station; said drive means including a push rod connected at a first end portion to a source of power, a second end portion of such push rod being in sliding engagement with a housing means, spring means engaging said push rod and said housing means to exert a force urging said push rod and housing means into a driving relationship wherein both said push rod and housing means are reciprocated by said source of power to drive said conveyor means and said magnetic roller means, said conveyor means and magnetic roller means exerting an overload force on said housing means when the supply of articles at said article-receiving station exceeds a predetermined amount, said overload force being in opposition to the force exerted by said spring means and of sufficient value to hold said housing means substantially stationary while said push rod is reciprocated relative to said housing means by said source of power, whereby said source of power is ineffective for driving said conveyor means and said magnetic roller means when the supply of articles at said article-receiving station exceeds the predetermined quantity.

8. An article handling assembly as set forth in claim 7 further including: adjusting means positioned in engagement with said push rod and spring means for varying the force exerted on said push rod and housing means by said spring means to enable the predetermined quantity of articles required at the article-receiving station for causing said conveyor means to hold said housing means substantially constant to be varied.

9. An article handling assembly as set forth in claim 7 wherein: said conveyor means includes a pair of spaced apart, substantially parallel belt means, said belt means being positioned in engagement with said magnetic roller means so that said belt means is moved by rotation of said magnetic roller means to transport can ends into engagement with said magnetic roller means.

References Cited

UNITED STATES PATENTS

| 3,178,005 | 4/1965 | Read | 198—24 |
| 1,208,402 | 12/1916 | Thomas | 198—35 X |
| 1,358,255 | 11/1920 | Seufer et al. | 198—232 |
| 2,926,774 | 3/1960 | Oppermann | 198—232 |
| 2,985,275 | 5/1961 | Lane | 198—135 X |
| 3,153,471 | 10/1964 | Arnett | 198—41 X |
| 3,164,269 | 1/1965 | Roosevelt | 198—41 X |
| 3,334,724 | 8/1967 | Steward | 198—41 |

FOREIGN PATENTS 876,698   9/1961   Great Britain.

EDWARD A. SROKA, *Primary Examiner.*

R. J. HICKEY, *Assistant Examiner.*

U.S. Cl. X.R.
198—25, 41, 203